(12) United States Patent
Zhang et al.

(10) Patent No.: US 10,333,410 B2
(45) Date of Patent: Jun. 25, 2019

(54) COMMON-MODE (CM) ELECTROMAGNETIC INTERFERENCE (EMI) REDUCTION IN RESONANT CONVERTERS

(71) Applicants: Futurewei Technologies, Inc., Plano, TX (US); University of Florida Research Foundation, Incorporated, Gainesville, FL (US)

(72) Inventors: Huan Zhang, Gainesville, FL (US); Heping Dai, Plano, TX (US); Shuo Wang, Gainesville, FL (US)

(73) Assignees: Futurewei Technologies, Inc., Plano, TX (US); University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/682,989

(22) Filed: Aug. 22, 2017

(65) Prior Publication Data
US 2018/0074538 A1 Mar. 15, 2018

Related U.S. Application Data

(60) Provisional application No. 62/395,231, filed on Sep. 15, 2016.

(51) Int. Cl.
*H02M 3/335* (2006.01)
*B23P 19/04* (2006.01)
*G05F 3/06* (2006.01)

(52) U.S. Cl.
CPC ............ *H02M 3/335* (2013.01); *B23P 19/04* (2013.01); *G05F 3/06* (2013.01)

(58) Field of Classification Search
CPC . H02M 3/335–3/338; G05F 3/06; B23P 19/04
See application file for complete search history.

(56) References Cited

U.S. PATENT DOCUMENTS

| 2,995,651 | A | * | 8/1961 | Bock | H03D 7/08 |
| | | | | | 331/170 |
| 3,440,553 | A | * | 4/1969 | Gerard | H03F 1/347 |
| | | | | | 330/102 |

(Continued)

FOREIGN PATENT DOCUMENTS

| CN | 104242657 A | 12/2014 |
| KR | 20080030766 A | 4/2008 |

OTHER PUBLICATIONS

Abdel-Rahman, "Resonant LLC Converter: Operation and Design, 250W 33Vin 400Vout Design Example," Infineon Technologies North America (IFNA) Corp., Application Note AN 2012-09, V1.0 Sep. 2012, 19 pages.

(Continued)

*Primary Examiner* — Yusef A Ahmed
(74) *Attorney, Agent, or Firm* — Conley Rose, P.C.

(57) ABSTRACT

An apparatus includes: a first inductor coupled to a first node and a second node; a second inductor coupled to a third node and a fourth node; a third inductor coupled to the fourth node and a fifth node, wherein the first inductor, the second inductor, and the third inductor form a transformer; and a compensation capacitor coupled to the fourth node and one of the first node and the second node and including, a compensation capacitance. A method of manufacturing a resonant converter, the method includes: obtaining the resonant converter, wherein the resonant converter includes a transformer; determining a parasitic capacitance of the transformer; calculating a compensation capacitance based on the parasitic capacitance; and adding a compensation capacitor across the transformer, wherein the compensation capacitor includes the compensation capacitance.

20 Claims, 9 Drawing Sheets

(56) References Cited

U.S. PATENT DOCUMENTS

| | | | | | |
|---|---|---|---|---|---|
| 3,560,894 | A | * | 2/1971 | Fettweis | H03H 9/542 333/190 |
| 4,274,133 | A | * | 6/1981 | Cuk | H02M 3/005 363/20 |
| 4,626,728 | A | * | 12/1986 | Flachenecker | B06B 1/0253 310/316.01 |
| 4,859,921 | A | * | 8/1989 | Archer | H02M 7/5387 318/599 |
| 5,285,179 | A | * | 2/1994 | Wignot | H03J 3/26 333/25 |
| 6,546,100 | B1 | * | 4/2003 | Drew | H01F 17/08 178/46 |
| 6,549,071 | B1 | * | 4/2003 | Paul | H01L 23/645 330/252 |
| RE40,020 | E | * | 1/2008 | Kiko | H03G 7/00 379/30 |
| 7,554,820 | B2 | * | 6/2009 | Stanley | H02M 3/3376 363/17 |
| 9,281,853 | B2 | * | 3/2016 | Ong | H04B 1/109 |
| 9,660,536 | B2 | * | 5/2017 | Hosotani | H02M 3/338 |
| 9,876,435 | B2 | * | 1/2018 | Chen | H02M 1/08 |
| 2004/0032753 | A1 | * | 2/2004 | Liu | B29C 45/76 363/39 |
| 2008/0094160 | A1 | * | 4/2008 | Wang | H01F 17/062 336/69 |
| 2008/0204126 | A1 | * | 8/2008 | Wang | H04B 15/02 327/551 |
| 2009/0279642 | A1 | * | 11/2009 | Zarei | H03D 3/006 375/327 |
| 2010/0007439 | A1 | * | 1/2010 | Chen | H03H 7/09 333/177 |
| 2010/0244983 | A1 | * | 9/2010 | Allen | H03H 7/06 333/168 |
| 2011/0074525 | A1 | * | 3/2011 | Kameya | H03H 7/0115 333/181 |
| 2011/0117860 | A1 | * | 5/2011 | Kimball | H03F 1/565 455/73 |
| 2012/0075036 | A1 | * | 3/2012 | Kameya | H03H 7/427 333/140 |
| 2012/0161890 | A1 | * | 6/2012 | Li | H03B 5/1225 331/117 FE |
| 2013/0063219 | A1 | * | 3/2013 | Shanan | H03B 1/04 331/117 FE |
| 2013/0265804 | A1 | * | 10/2013 | Fu | H02M 3/33576 363/17 |
| 2013/0294113 | A1 | | 11/2013 | Liang et al. | |
| 2014/0254203 | A1 | * | 9/2014 | Dai | H02M 3/3353 363/17 |
| 2014/0268897 | A1 | * | 9/2014 | Zimmanck | H02M 3/3353 363/17 |
| 2014/0320215 | A1 | * | 10/2014 | Staszewski | H03H 11/0405 331/18 |
| 2014/0361856 | A1 | * | 12/2014 | Leipold | H03H 7/0115 333/24 C |
| 2015/0009727 | A1 | * | 1/2015 | Zhou | H02M 1/44 363/40 |
| 2015/0124488 | A1 | * | 5/2015 | Dai | H02M 1/36 363/17 |
| 2015/0177344 | A1 | * | 6/2015 | Han | G01R 33/3628 324/322 |
| 2017/0214278 | A1 | * | 7/2017 | Hosotani | H02J 50/12 |
| 2017/0317596 | A1 | * | 11/2017 | Ishigaki | H02M 3/285 |
| 2017/0324341 | A1 | * | 11/2017 | Shin | H02M 3/33546 |
| 2018/0226896 | A1 | * | 8/2018 | Miller | H02M 3/33592 |
| 2019/0028035 | A1 | * | 1/2019 | Choi | H02M 3/33569 |

OTHER PUBLICATIONS

"Information Technology Equipment—Radio Disturbance Characteristics—Limits and Methods of Measurement," BSI Standards Publication, BS EN 55022:2010; Jul. 31, 2011, 85 pages.
Machine Translation and Abstract of Chinese Publication No. CN104242657, Dec. 24, 2014, 18 pages.
Machine Translation and Abstract of Korean Publication No. KR20080030766, Apr. 7, 2008, 6 pages.
Foreign Communication From a Counterpart Application, PCT Application No. PCT/CN2017/101787, English Translation of International Search Report dated Dec. 25, 2017, 7 pages.
Foreign Communication From a Counterpart Application, PCT Application No. PCT/CN2017/101787, English Translation of Written Opinion dated Dec. 25, 2017, 3 pages.

* cited by examiner

COMMON-MODE (CM) ELECTROMAGNETIC INTERFERENCE (EMI) REDUCTION IN RESONANT CONVERTERS

CROSS-REFERENCE TO RELATED APPLICATIONS

This application claims priority to U.S. provisional patent application No. 62/395,231 filed on Sep. 15, 2016 by Huan Zhang, et al., and titled "Common-Mode (CM) Electromagnetic Interference (EMI) Reduction in Resonant Converters," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications has proliferated over the last century, but particularly over the last two decades with optical communications and wireless communications. Optical communications employs fiber cabinets, and wireless communications employs base stations. Fiber cabinets and base stations, as well as other such network components, use high-voltage power supplies. The high-voltage power supplies may operate at 380 V or higher and therefore implement DC-to-DC converters for both voltage step-up and voltage step-down purposes. One such DC-to-DC converter is an LLC resonant converter.

SUMMARY

It is desirable to accurately model the LLC resonant converter in order to account for and reduce the EMI, particularly CM EMI, in the LLC resonant converter. It is also desirable to accurately model full-bridge LLC resonant converters. According to various embodiments of the present disclosure, reducing CM EMI in resonant converters, including full-bridge LLC resonant converters, is provided. The embodiments provide for measuring parasitic capacitances of converters, modeling the converters, and determining compensation capacitors for the converters based on the modeling. The compensation capacitors are added across transformers of the converters and reduce CM EMI. The embodiments apply to three-winding, two-winding, and other suitable converters. The embodiments are practical because adding compensation capacitors is both simple and low cost. Furthermore, by reducing CM EMI, the embodiments provide for smaller, lower cost, and more efficient EMI filters compared to other converters.

In one embodiment, the disclosure includes an apparatus comprising: a first inductor coupled to a first node and a second node; a second inductor coupled to a third node and a fourth node; a third inductor coupled to the fourth node and a fifth node, wherein the first inductor, the second inductor, and the third inductor form a transformer; and a compensation capacitor coupled to the fourth node and one of the first node and the second node and comprising a compensation capacitance. In some embodiments, the apparatus further comprises: a first parasitic capacitor between the first node and the fourth node and comprising a first parasitic capacitance; and a second parasitic capacitor between the second node and the fourth node and comprising a second parasitic capacitance; the first parasitic capacitor and the second parasitic capacitor are not physical capacitors; the compensation capacitor is coupled to the fourth node and the first node, and wherein a sum of the compensation capacitance and the first parasitic capacitance is substantially equal to the second parasitic capacitance; the compensation capacitor is coupled to the fourth node and the second node, and wherein a sum of the compensation capacitance and the second parasitic capacitance is substantially equal to the first parasitic capacitance; the apparatus is a full-bridge LLC circuit; the compensation capacitor is an adjustable capacitor.

In another embodiment, the disclosure includes an apparatus comprising: a first inductor coupled to a first node and a second node; a second inductor coupled to a third node and a fourth node, wherein the first inductor and the second inductor form a transformer comprising a turns ratio; and a compensation capacitor comprising a compensation capacitance and coupled to one of the first node and the third node, the first node and the fourth node, the second node and the third node, and the second node and the fourth node. In some embodiments, the apparatus further comprises: a first parasitic capacitor between the first node and the third node and comprising a first parasitic capacitance; a second parasitic capacitor between the first node and the fourth node and comprising a second parasitic capacitance; a third parasitic capacitor between the second node and the third node and comprising a third parasitic capacitance; and a fourth parasitic capacitor between the second node and the fourth node and comprising a fourth parasitic capacitance; the compensation capacitor is coupled to the first node and the third node, and wherein the compensation capacitance is configured to substantially satisfy an equation based on the first parasitic capacitance, the compensation capacitance, the turns ratio, and the third parasitic capacitance; the equation is $$C_{BD} = \frac{n+1}{n-1} C_{CD},$$

where $C_{BD}$ is a sum of the first parasitic capacitance and the compensation capacitance, n is the turns ratio, and $C_{CD}$ is the third parasitic capacitance; the compensation capacitor is coupled to the first node and the fourth node, and wherein the compensation capacitance is configured to substantially satisfy an equation based on the second parasitic capacitance, the compensation capacitance, the turns ratio, and the fourth parasitic capacitance; the equation is $$C_{BE} = \frac{n-1}{n+1} C_{CE},$$

where $C_{BE}$ is a sum of the second parasitic capacitance and the compensation capacitance, n is the turns ratio, and $C_{CE}$ is the fourth parasitic capacitance; the compensation capacitor is coupled to the second node and the third node, and wherein the compensation capacitance is configured to substantially satisfy an equation based on the first parasitic capacitance, the turns ratio, the third parasitic capacitance, and the compensation capacitance; the equation is $$C_{BD} = \frac{n+1}{n-1} C_{CD},$$

where $C_{BD}$ is the first parasitic capacitance, n is the turns ratio, and $C_{CD}$ is a sum of the third parasitic capacitance and the compensation capacitance; the compensation capacitor is coupled to the second node and the fourth node, and wherein the compensation capacitance is configured to substantially satisfy an equation based on the second parasitic capacitance, the turns ratio, the fourth parasitic capacitance, and the compensation capacitance; the equation is $$C_{BE} = \frac{n-1}{n+1} C_{CE},$$

where $C_{BE}$ is the second parasitic capacitance, n is the turns ratio, and $C_{CE}$ is a sum of the fourth parasitic capacitance and the compensation capacitance; the compensation capacitor is an adjustable capacitor.

In yet another embodiment, the disclosure includes a method of manufacturing a resonant converter, the method comprising: obtaining the resonant converter, wherein the resonant converter comprises a transformer; determining a parasitic capacitance of the transformer; calculating a compensation capacitance based on the parasitic capacitance; and adding a compensation capacitor across the transformer, wherein the compensation capacitor comprises the compensation capacitance. In some embodiments, calculating the compensation capacitance comprises: determining a Thevenin equivalent voltage of the resonant converter; and calculating the compensation capacitance in order to substantially eliminate the Thevenin equivalent voltage.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms and initialisms apply:
AC: alternating current
CM: common-mode
dB: decibel(s)
DC: direct current
EMI: electromagnetic interference
EN: European norm
Hz: hertz
LISN: line impedance stabilizer network
LLC: inductor-inductor-capacitor
nF: nanofarad(s)
V: volt(s)
μV: microvolt(s)
%: percent.

Figure 1:
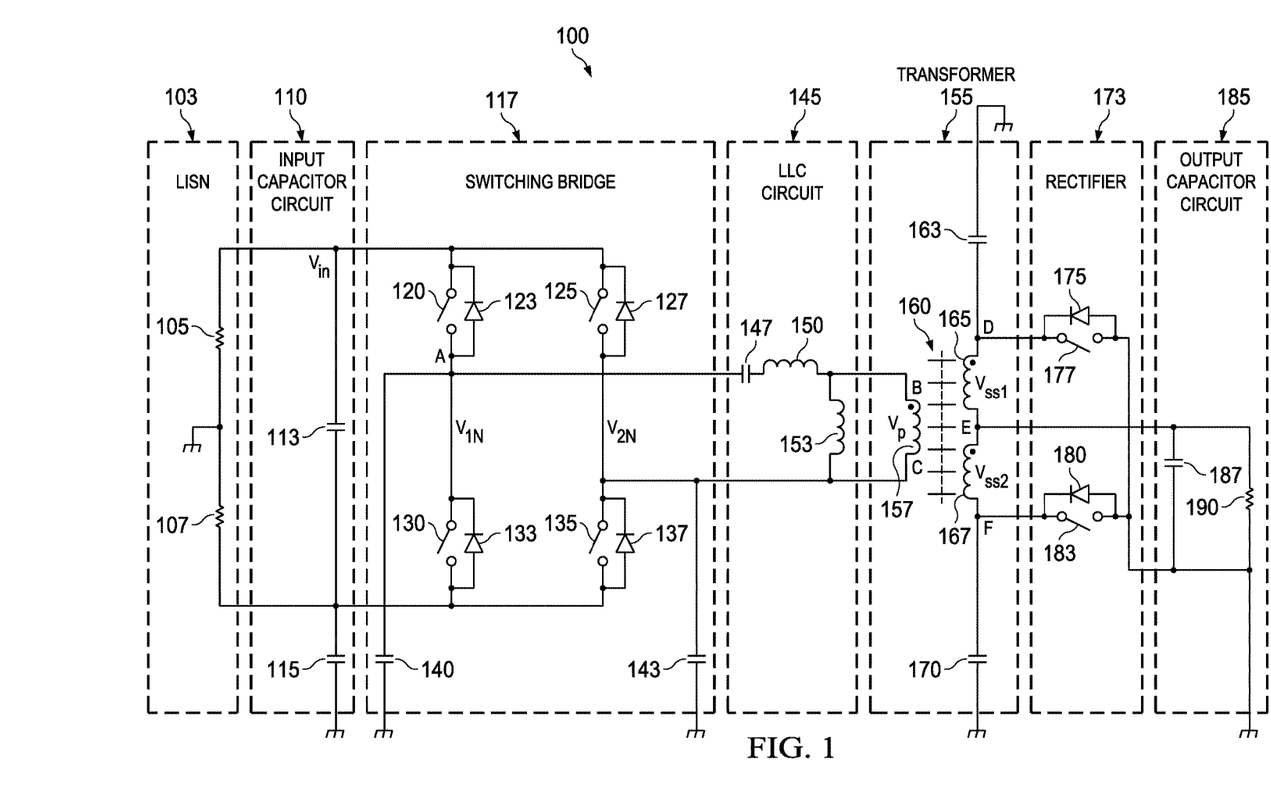
FIG. 1 is a schematic diagram of an LLC resonant converter.

FIG. 1 is a schematic diagram of an LLC resonant converter 100. The LLC resonant converter 100 generally comprises an LISN 103, an input capacitor circuit 110, a switching bridge 117, an LLC circuit 145, a transformer 155, a rectifier 173, and an output capacitor circuit 185. The LISN 103 is modeled as resistors 105, 107. The input capacitor circuit 110 comprises capacitors 113, 115. The switching bridge 117 comprises switches 120, 125, 130, 135; diodes 123, 127, 133, 137; and capacitors 140, 143. The LLC circuit 145 comprises a capacitor 147 and inductors 150, 153. The transformer 155 also comprises the inductor 153 and further comprises windings 157, 165, 167 and capacitors 160, 163, 170. The rectifier 173 comprises diodes 175, 180 and switches 177, 183. The output capacitor circuit 185 comprises a capacitor 187 and a resistor 190.

The capacitors 115, 140, 143, 160, 163, 170 may be referred to as parasitic capacitors. The capacitors 115, 140, 143, 160, 163, 170 are not physical capacitors, but are instead virtual capacitors that model capacitances due to characteristics of the LLC resonant converter 100. For instance, the capacitor 115 models the parasitic capacitance of a positive line and a negative line that couple to the capacitor 113 and form a DC bus. The switches 120, 125, 130, 135, 177, 183 may be transistors. The inductor 153 provides a magnetizing inductance for the transformer. The winding 157 is referred to as a primary winding, and the windings 165, 167 are referred to as secondary windings. Thus, the switches 120, 125, 130, 135 are on a primary side of the LLC resonant converter 100. Because the transformer 155 comprises the three windings 157, 165, 167, the LLC resonant converter 100 is referred to as a three-winding resonant converter. The LLC resonant converter 100 is also referred to as a full-bridge LLC resonant converter because it comprises four switches, specifically the switches 120, 125, 130, 135, on its primary side. In contrast, a half-bridge LLC resonant converter comprises two such switches, for instance the switches 120, 130. The resistor 190 may be referred to as a resistor load.

In operation, the switching bridge 117 generates a square waveform to excite the LLC circuit 145. In response, the LLC circuit 145 outputs a resonant sinusoidal current, or AC current. The transformer 155 scales the AC current from the LLC circuit 145. The rectifier 173 rectifies the AC current, in other words, converts the AC current to a DC current. Finally, the output capacitor circuit 185 filters the DC current and outputs a DC voltage.

The LLC resonant converter 100 suffers from EMI. For instance, the voltage at node A increases quickly from 0 V to $V_{in}$ when the switch 120 closes. That quick increase in voltage with respect to time may generate a substantial current through the capacitor 140. That current may be a source of EMI, which degrades the performance of the LLC resonant converter 100. It is therefore desirable to accurately model the LLC resonant converter 100 in order to account for and reduce the EMI, particularly CM EMI, in the LLC resonant converter 100. CM EMI is EMI that appears on two signal lines simultaneously and in the same direction and phase. CM EMI must go to ground. In addition, prior modeling of LLC resonant converters for EMI focuses on half-bridge LLC resonant converters, not full-bridge LLC resonant converters like the LLC resonant converter 100. It is therefore desirable to accurately model full-bridge LLC resonant converters.

Disclosed herein are embodiments for reducing CM EMI in resonant converters, including full-bridge LLC resonant converters. The embodiments provide for measuring parasitic capacitances of converters, modeling the converters, and determining compensation capacitors for the converters based on the modeling. The compensation capacitors are added across transformers of the converters and reduce CM EMI. The embodiments apply to three-winding, two-winding, and other suitable converters. The embodiments are practical because adding compensation capacitors is both simple and low cost. Furthermore, by reducing CM EMI, the embodiments provide for smaller, lower cost, and more efficient EMI filters compared to other converters.

Figure 2:
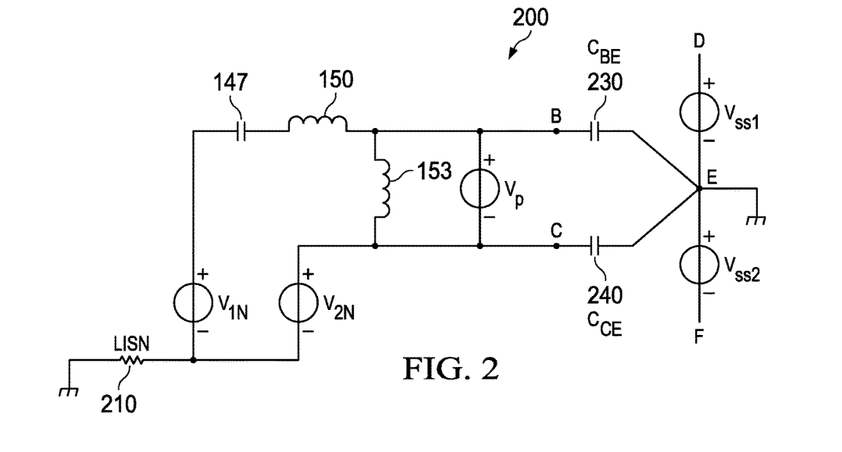
FIG. 2 is a schematic diagram of a first stage of a model of the LLC resonant converter in FIG. 1 according to an embodiment of the disclosure.

FIG. 2 is a schematic diagram of a first stage 200 of a model of the LLC resonant converter 100 in FIG. 1 according to an embodiment of the disclosure. The model comprises three stages in order to show increasing simplification with each successive stage. The first stage 200 comprises an LISN 210; voltage sources $V_{1N}$, $V_{2N}$, $V_p$, $V_{ss1}$, $V_{ss2}$; capacitors 147, 230, 240; and inductors 150, 153. The LISN 210 represents the resistors 105, 107 in the LISN 103 as a single resistor. The voltage sources $V_{1N}$, $V_{2N}$, $V_p$, $V_{ss1}$, $V_{ss2}$ represent their corresponding voltages at nodes in the LLC resonant converter 100. The capacitors 230, 240 represent the parasitic capacitance 160 of the transformer 155. Specifically, the capacitor 230 represents a capacitance across the transformer 155 from node B to node E and is therefore denoted as $C_{BE}$, and the capacitor 240 represents a capacitance across the transformer 155 from node C to node E and is therefore denoted as $C_{CE}$.

The first stage 200 removes the switches 130, 135 and replaces them with the voltage sources $V_{1N}$, $V_{2N}$, respectively. The first stage 200 removes the switches 120, 125 177, 183 because they are in parallel with the voltage sources $V_{1N}$, $V_{2N}$, $V_{ss1}$, $V_{ss2}$, respectively. The first stage 200 removes the diodes 123, 133, because they are in parallel with the voltage source $V_{1N}$ and removes the diodes 127, 137 because they are in parallel with the voltage source $V_{2N}$. The first stage 200 removes the capacitors 113, 187 because their impedances are small at high frequencies. The first stage 200 removes the resistor 190 because the capacitor 187 shorts it. The first stage 200 removes the capacitor 115 because it is in parallel with the LISN 210, which has a small impedance. The first stage 200 removes the capacitors 140, 143 because together they generate no CM current. Finally, the first stage 200 removes the capacitors 163, 170 because together they generate no CM current in total.

Figure 3:
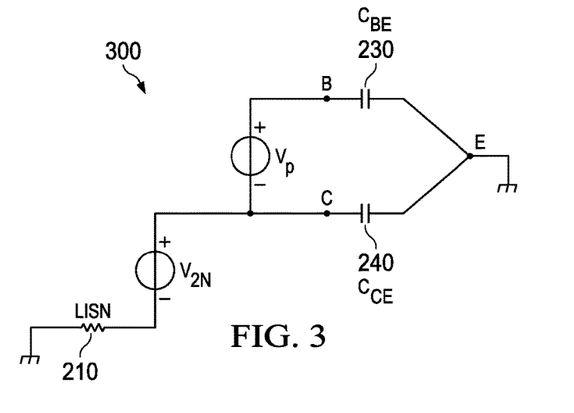
FIG. 3 is a schematic diagram of a second stage of the model of the LLC resonant converter in FIG. 1 according to an embodiment of the disclosure.

FIG. 3 is a schematic diagram of a second stage 300 of the model of the LLC resonant converter 100 in FIG. 1 according to an embodiment of the disclosure. The second stage 300 comprises the LISN 210; the voltage sources $V_{2N}$, $V_p$; and the capacitors 230, 240. The second stage 300 removes the voltage sources $V_{1N}$, $V_{ss1}$, $V_{ss2}$; the capacitor 147; and the inductors 150, 153. The second stage 300 may do so because those components do not generate CM EMI.

To analyze the voltage source $V_{1N}$ as an example, the second stage 300 shorts the remaining voltage sources from the first stage 200, namely the voltage sources $V_{2N}$, $V_p$, $V_{ss1}$, $V_{ss2}$. By doing so, a current from the voltage source $V_{1N}$ flows through the capacitor 147 and the inductor 150, then back to the voltage source $V_{1N}$. Thus, no current flows from a component to ground to generate CM EMI. The second stage 300 therefore need not comprise the voltage source $V_{1N}$ in order to model CM EMI. The second stage 300 may remove the voltage sources $V_{ss1}$, $V_{ss2}$; the capacitor 147; and the inductors 150, 153 for similar reasons.

In contrast, to analyze the voltage source $V_{2N}$ as an example, the second stage 300 shorts the remaining voltage sources from the first stage 200, namely the voltage sources $V_{1N}$, $V_p$, $V_{ss1}$, $V_{ss2}$. By doing so, a current from the voltage source $V_{2N}$ flows through the capacitors 230, 240, through node E, and then to ground. Thus, current flows from a component to ground to generate CM EMI. The second stage 300 therefore comprises the voltage source $V_{2N}$ in order to model CM EMI. The second stage 300 may retain the voltage source $V_p$ for a similar reason.

Figure 4:
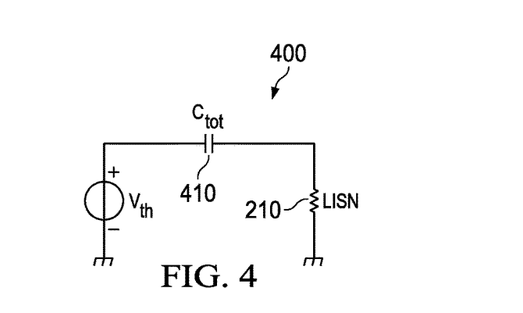
FIG. 4 is a schematic diagram of a third stage of the model of the LLC resonant converter in FIG. 1 according to an embodiment of the disclosure.

FIG. 4 is a schematic diagram of a third stage 400 of the model of the LLC resonant converter 100 in FIG. 1 according to an embodiment of the disclosure. The third stage 400 may be referred to as a Thevenin equivalent circuit. The third stage 400 comprises the voltage source $V_{th}$, a capacitor $C_{tot}$ 410, and the LISN 210. A capacitance of the capacitor $C_{tot}$ 410 is calculated as follows:

$$C_{tot} = C_{BE} + C_{CE} \tag{1}$$

The voltage source $V_{th}$ represents a Thevenin equivalent voltage, which is calculated as follows:

$$V_{th} = V_{2N} + V_p \frac{C_{BE}}{C_{BE} + C_{CE}}. \quad (2)$$

The voltage source $V_{th}$ models the primary generator of CM EMI in the third stage 400 and thus the LLC resonant converter 100. It is therefore desirable to reduce or eliminate the voltage source $V_{th}$.

In normal operation, the switching frequency of the LLC resonant converter 100 is close to the resonant frequency of the LLC converter 100. As a result, the sum of the voltage drop across the capacitor 147 and across the inductor 150 is small compared to the voltage source $V_p$. In addition, the voltage sources $V_{1N}$, $V_{2N}$ are out of phase and have the same magnitude, so the voltage source $V_p$ is approximately out of phase with, but has approximately twice the magnitude of, the voltage source $V_{2N}$. Thus, the voltage sources $V_{2N}$, $V_p$ are related as follows:

$$V_{2N} \approx -\frac{V_p}{2}. \quad (3)$$

The symbol ≈ denotes a near equality or an approximation. Substituting relationship (3) into equation (2) provides $$V_{th} = -\frac{V_p}{2} + V_p \frac{C_{BE}}{C_{BE} + C_{CE}}. \quad (4)$$

As can be seen, setting the capacitor $C_{BE}$ 230 equal to the capacitor $C_{CE}$ 240 as follows eliminates $V_{th}$ in equation (4):

$$C_{BE} = C_{CE} \quad (5)$$

Eliminating $V_{th}$, the primary generator of CM EMI, therefore reduces CM EMI.

Figure 5:
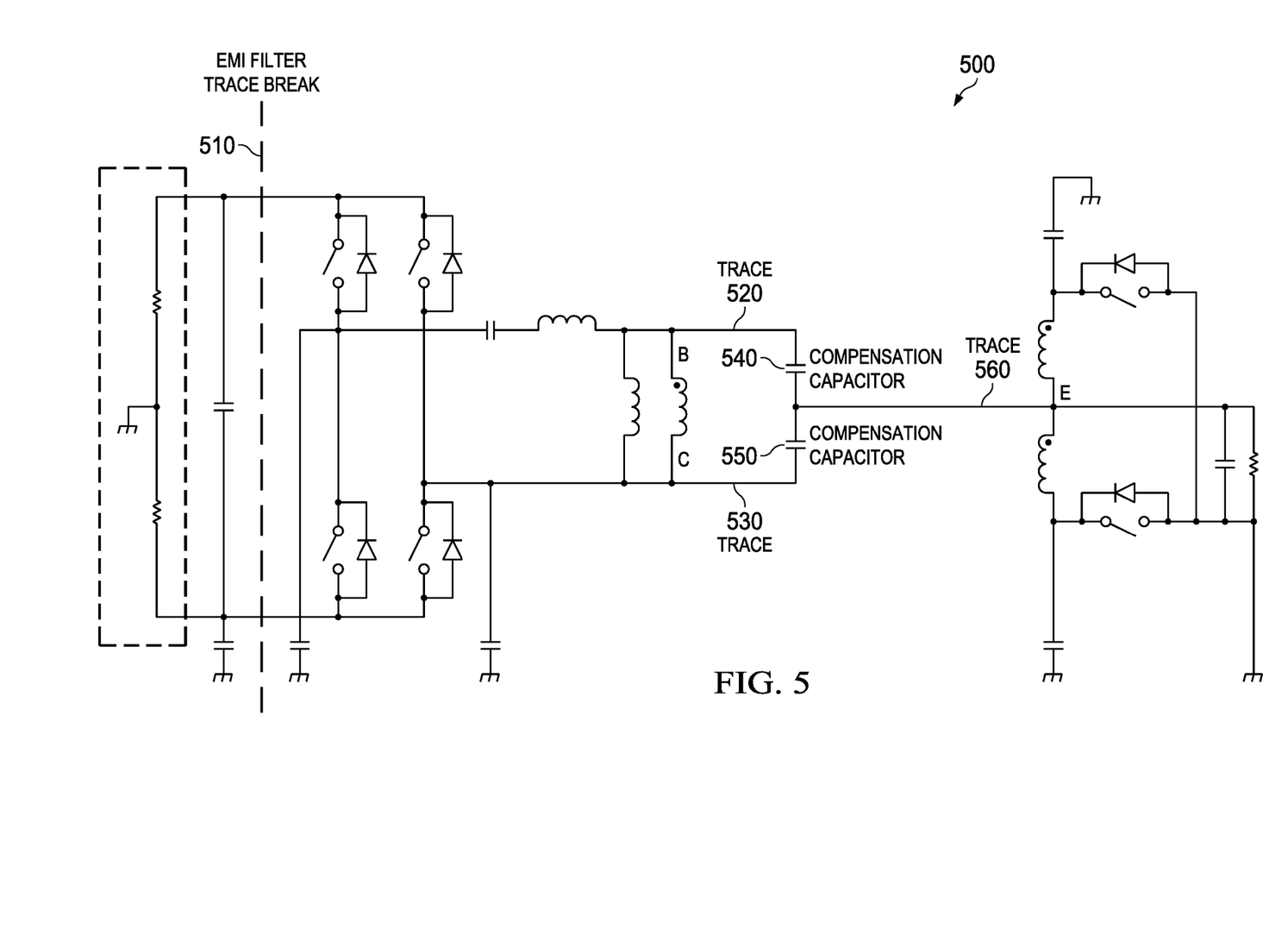
FIG. 5 is a schematic diagram of an LLC resonant converter according to an embodiment of the disclosure.

FIG. 5 is a schematic diagram of an LLC resonant converter 500 according to an embodiment of the disclosure. The LLC resonant converter 500 is similar to the LLC resonant converter 100 in FIG. 1. However, unlike the LLC resonant converter 100, the LLC resonant converter 500 comprises an EMI filter trace break 510; traces 520, 530, 560; and compensation capacitors 540, 550. Though not shown, the LLC resonant converter 500 further comprises a capacitor like the capacitor 160 in the LLC resonant converter 100.

The EMI filter trace break 510 provides for a break in traces of the LLC resonant converter 500 in order to insert an EMI filter. EMI filters are used in LLC resonant converters to reduce EMI. For the reasons described below, the LLC resonant converter 500 may implement a smaller, lower cost, and more efficient EMI filter compared to other LLC resonant converters such as the LLC resonant converter 100.

The traces 520, 560 provide a physical connection from node B to node E. The traces 520, 560 further provide a physical connection for the compensation capacitor 540 between node B and node E. The traces 520, 560 and the compensation capacitor 540 may be the only physical components between node B and node E. The traces 530, 560 provide a physical connection from node C to node E. The traces 530, 560 further provide a physical connection for the compensation capacitor 550 between node C and node E. The traces 530, 560 and the compensation capacitor 550 may be the only physical components between node C and node E.

The compensation capacitor 540 is directly coupled to node B and thus the inductors coupled to node B, as well as node E and thus the inductors and capacitor coupled to node E. Similarly, the compensation capacitor 550 is directly coupled to node C and thus the inductors coupled to node C, as well as node E and thus the inductors and capacitor coupled to node E. The compensation capacitors 540, 550 compensate a parasitic capacitance between the winding 157 on one hand and the windings 165, 167 on the other hand. That parasitic capacitance is represented as the capacitor 160 in the LLC resonant converter 100 and is modeled by the capacitors 230, 240 in the first stage 200 in FIG. 2; the capacitors 230, 240 in the second stage 300 in FIG. 3; and the capacitor $C_{tot}$ 410 in the third stage 400 in FIG. 4. By compensating the parasitic capacitor 160, the compensation capacitors 540, 550 satisfy or substantially satisfy equation (5) and therefore reduce CM EMI.

Specifically, the compensation capacitor 540 compensates the parasitic capacitor 160 by complementing the capacitor $C_{BE}$ 230 in the first stage 200 in FIG. 2 and the second stage 300 in FIG. 3. Similarly, the compensation capacitor 550 compensates the parasitic capacitance by complementing the capacitor $C_{CE}$ 240 in the first stage 200 and the second stage 300. The compensation capacitor 540 and the compensation capacitor 550 compensate the capacitor $C_{BE}$ 230 and the capacitor $C_{CE}$, respectively, because they are parallel to the capacitor $C_{BE}$ 230 and the capacitor $C_{CE}$ and because capacitances of capacitors in parallel add together. Thus, a sum of the compensation capacitor 540 and the capacitor $C_{BE}$ 230 may be denoted as the capacitor $C_{BE}$ in equation (5), and a sum of the compensation capacitor 550 and the capacitor $C_{CE}$ 240 may be denoted as the capacitor $C_{CE}$ in equation (5). The compensation capacitors 540, 550 may be adjustable capacitors in order to account for changes in the capacitors 230, 240 due to age, temperature, and other factors.

A manufacturer may fabricate the LLC resonant converter 500 in different manners. In a first embodiment, the manufacturer first fabricates the LLC resonant converter 500 without the compensation capacitors 540, 550; second measures the capacitances of the capacitors 230, 240; and third adds the compensation capacitor 540, the compensation capacitor 550, or both in order to satisfy or substantially satisfy equation (5). In the latter case, both compensation capacitors 540, 550 may comprise capacitances to satisfy equation (5). In a second embodiment, the manufacturer first fabricates the LLC resonant converter 500 with the compensation capacitors 540, 550 as adjustable capacitors; second measures the capacitances of the capacitors 230, 240; and third adjusts the capacitances of the compensation capacitors 540, the compensation capacitor 550, or both in order to satisfy or substantially satisfy equation (5).

Figure 6:
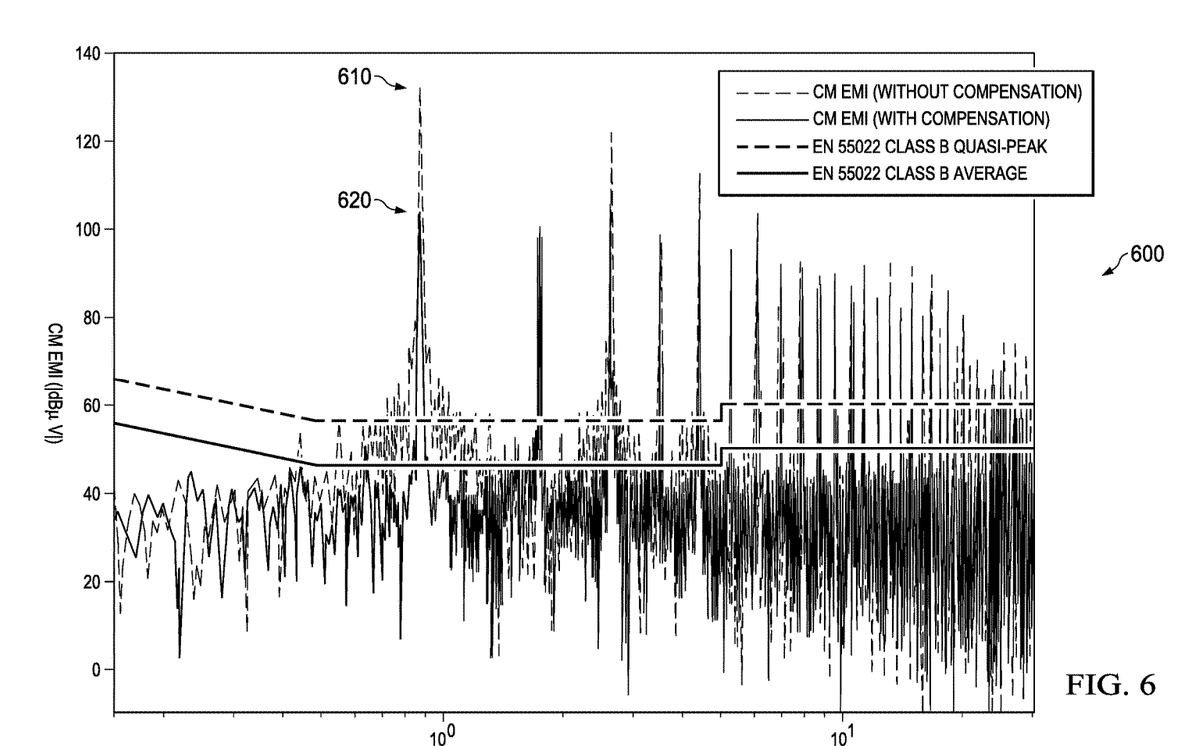
FIG. 6 is a graph of measured CM EMI curves and standard CM EMI curves according to an embodiment of the disclosure.

FIG. 6 is a graph 600 of measured CM EMI curves and standard CM EMI curves according to an embodiment of the disclosure. The x-axis of the graph 600 represents frequency in units of Hz, and the y-axis represents CM EMI absolute value magnitude in units of dBμV. The thin dashed line represents CM EMI for the LLC resonant converter 100 in FIG. 1, which is without compensation. The thin solid line represents CM EMI for the LLC resonant converter 500 in FIG. 5, which is with compensation, namely the compensation capacitors 540, 550. The thick dashed line represents a standard quasi-peak CM EMI as required in Table 2 in section 5.1 of "Information technology equipment—Radio disturbance characteristics—Limits and methods of measurement," BS EN 55022:2010, Jul. 31, 2011 ("BS EN 55022"), which is incorporated by reference. The thick solid line represents a standard average CM EMI as required in Table 2 of BS EN 55022.

Specifically, the LLC resonant converter 100 was fabricated and measured to determine its CM EMI. The peak 610 shows a maximum CM EMI of the LLC resonant converter 100 of about 130 dBµV. In addition, the LLC resonant converter 500 was fabricated and measured to determine the capacitances of the capacitors 230, 240 and its CM EMI. The capacitor $C_{BE}$ 230 was measured to have a capacitance of 2.72 nF, and the capacitor $C_{CE}$ 240 was measured to have a capacitance of 4.08 nF. In order to satisfy equation (5), the compensation capacitor 540 had a capacitance of 1.36 nF to satisfy equation (5) as follows:

$$C_{BE} = C_{CE}$$

$$2.72 \text{ nF} + 1.36 \text{ nF} = 4.08 \text{ nF}. \tag{6}$$

The compensation capacitor 550 had a capacitance of 0 nF. The peak 620 shows a maximum CM EMI of the LLC resonant converter 500 of about 105 dBµV. Thus, the addition of the capacitor 540 reduced the CM EMI by about 25 dBµV compared to LLC resonant converter 100. Alternatively, if the capacitor $C_{BE}$ 230 were measured to have a capacitance of 4.08 nF and the capacitor $C_{CE}$ 240 were measured to have a capacitance of 2.72 nF, then the compensation capacitor 540 would have a capacitance of 0 nF and the compensation capacitor 550 would have a capacitance of 1.36 nF.

The CM EMI of about 105 dBµV for the LLC resonant converter 500 at the peak 620 is still above both the standard peak CM EMI and the standard average CM EMI, which are at about 55 dBµV and 45 dBµV, respectively, at about the same frequency. The EMI filter of the LLC resonant converter 500 therefore further reduces the CM EMI below both the standard peak CM EMI and the standard average CM EMI. Because the addition of the capacitor 540 reduced the CM EMI by about 25 dBµV compared to LLC resonant converter 100, the EMI filter in the LLC resonant converter 500 need not reduce the CM EMI as much as it would need to without the compensation capacitor 540. Thus, the EMI filter in the LLC resonant converter 100 may be smaller, lower cost, and more efficient than the EMI filter in the LLC resonant converter 100.

In this context, the phrase "substantially satisfy" and its variants may mean within 2.5%, 5%, 10%, or another suitable margin of error. Looking at equation (6), if the capacitance of the compensation capacitor 540 were 1.00 nF instead of 1.36 nF, then the capacitance of $C_{BE}$ would be 3.72 nF, which is about 8.8% less than the 4.08 nF capacitance of $C_{CE}$. The difference of 8.8% is within a 10% margin of error, but not a 2.5% or 5% margin of error.

Figure 7:
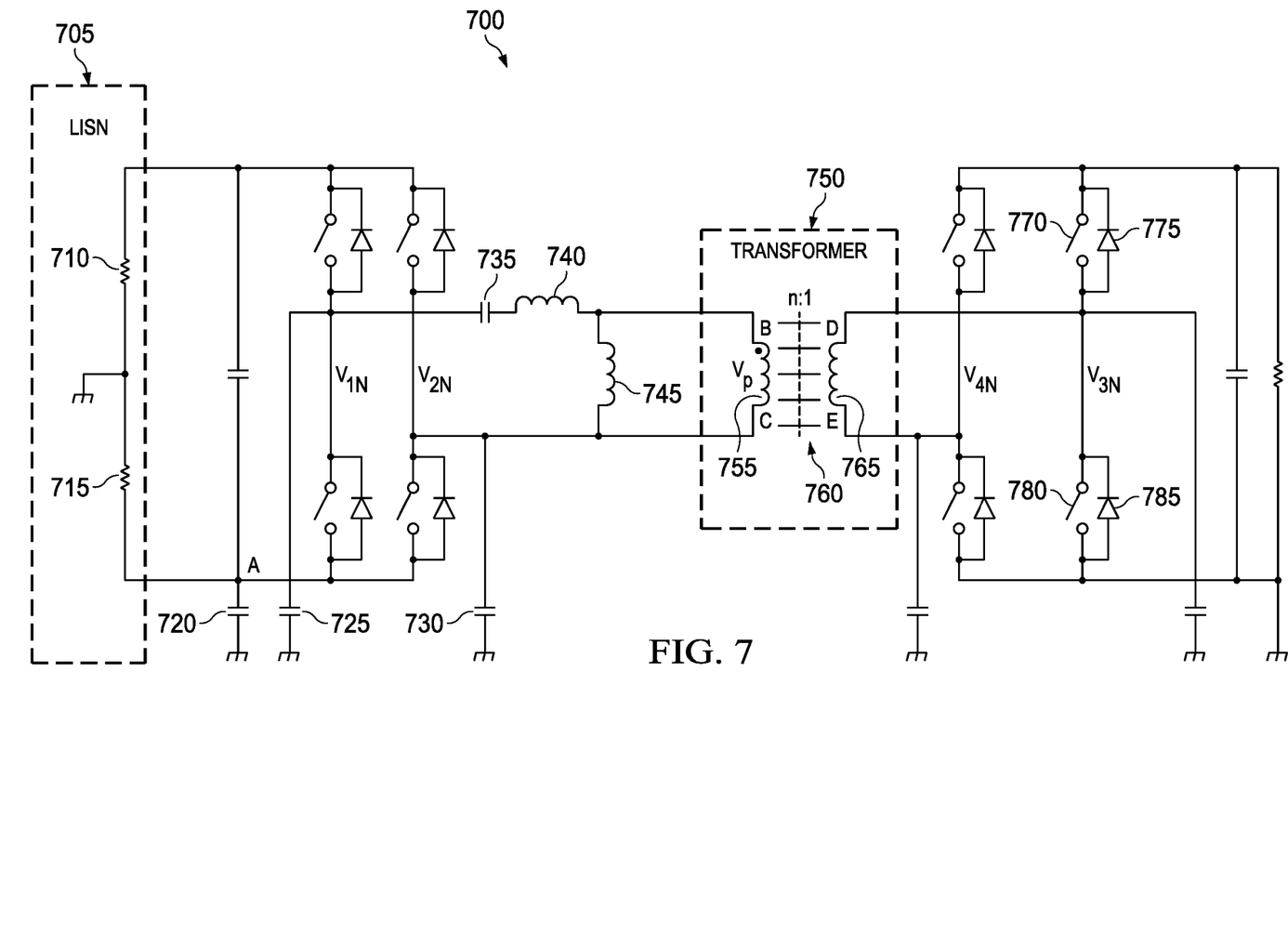
FIG. 7 is a schematic diagram of an LLC resonant converter.

FIG. 7 is a schematic diagram of an LLC resonant converter 700. The LLC resonant converter 700 is similar to the LLC resonant converter 100 in FIG. 1. However, the LLC resonant converter 100 and the LLC resonant converter 700 have two main differences. First, the LLC resonant converter 100 comprises a transformer 155 comprising one winding 157 on a primary side and two windings 165, 167 on a secondary side, while the LLC resonant converter 700 comprises a transformer 750 comprising one winding 755 on a primary side and one winding 765 on a secondary side. The windings 755, 765 form a parasitic capacitance 760. Because the LLC resonant converter 700 comprises the two windings 755, 765 in the transformer 750, the LLC resonant converter 700 is referred to as a two-winding resonant converter. The transformer 750 comprises an n:1, or simply n, turns ratio. Second, the LLC resonant converter 100 comprises a half bridge on its secondary side, while the LLC resonant converter 700 comprises a full bridge on its secondary side. The full bridge comprises switches 770, 780 and diodes 775, 785. Like the LLC resonant converter 100, the LLC resonant converter 700 further comprises an LISN 705 comprising resistors 710, 715; capacitors 720, 725, 730, 735; inductors 740, 745; and other similar components.

Figure 8:
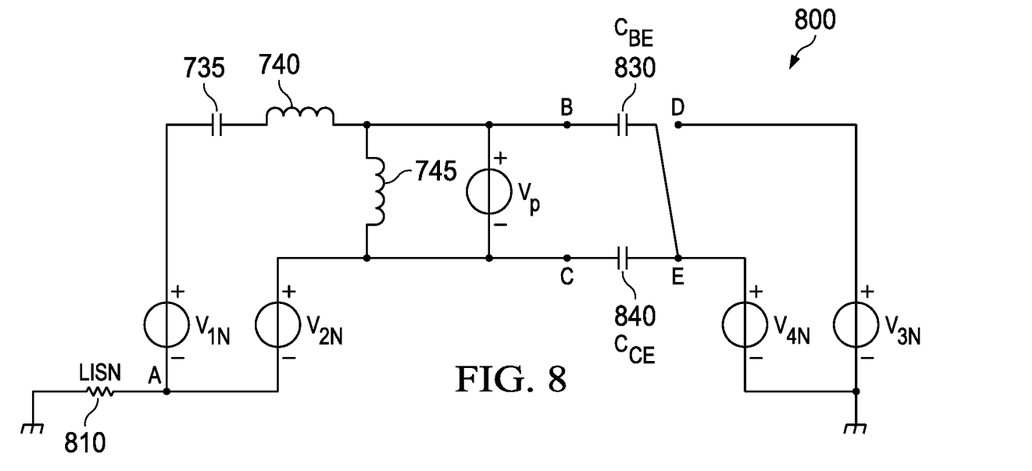
FIG. 8 is a schematic diagram of a first stage of a first model of the LLC resonant converter in FIG. 7 according to an embodiment of the disclosure.

FIG. 8 is a schematic diagram of a first stage 800 of a first model of the LLC resonant converter 700 in FIG. 7 according to an embodiment of the disclosure. The first model comprises three stages in order to show increasing simplification with each successive stage. There are two models, the first model for a first set of compensation capacitors and a second model for a second set of compensation capacitors. The first stage 800 is similar to the first stage 200 in FIG. 2. Specifically, like the first stage 200, the first stage 800 comprises an LISN 810; voltage sources $V_{1N}$, $V_{2N}$, $V_p$; capacitors 735, 830, 840; and inductors 740, 745. However, unlike the first stage 200, the first stage 800 further comprises voltage sources $V_{4N}$, $V_{3N}$. The LISN 810 represents the resistors 710, 715 in the LISN 705 as a single resistor. The voltage sources $V_{1N}$, $V_{2N}$, $V_p$, $V_{4N}$, $V_{3N}$ represent their corresponding voltages at nodes in the LLC resonant converter 700. The capacitor 830 represents a capacitance across the transformer 750 from node B to node E and is therefore denoted as $C_{BE}$, and the capacitor 840 represents a capacitance across the transformer 750 from node C to node E and is therefore denoted as $C_{CE}$.

Figure 9:
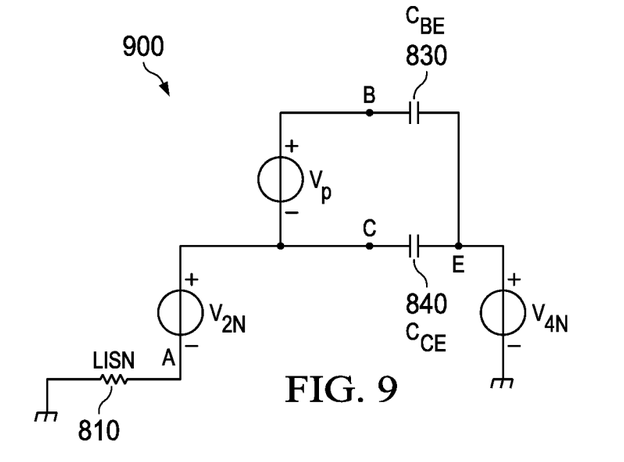
FIG. 9 is a schematic diagram of a second stage of the first model of the LLC resonant converter in FIG. 7 according to an embodiment of the disclosure.

FIG. 9 is a schematic diagram of a second stage 900 of the first model of the LLC resonant converter 700 in FIG. 7 according to an embodiment of the disclosure. The second stage 900 comprises the LISN 810; the voltage sources $V_{2N}$, $V_p$, $V_{4N}$; and the capacitors $C_{BE}$ 830, $C_{CE}$ 840. The second stage 900 removes the voltage sources $V_{1N}$, $V_{3N}$; the capacitor 735; and the inductors 740, 745. The second stage 900 may do so because those components do not generate CM EMI.

Figure 10:
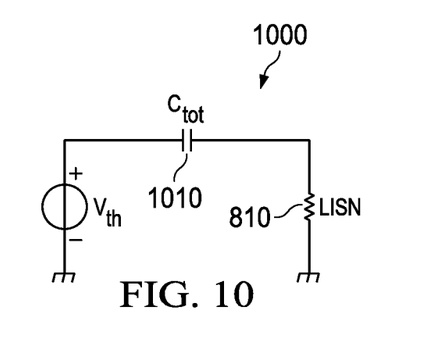
FIG. 10 is a schematic diagram of a third stage of the first model of the LLC resonant converter in FIG. 7 according to an embodiment of the disclosure.

FIG. 10 is a schematic diagram of a third stage 1000 of the first model of the LLC resonant converter 700 in FIG. 7 according to an embodiment of the disclosure. The third stage 1000 may be referred to as a Thevenin equivalent circuit. The third stage 1000 comprises the voltage source $V_{th}$, a capacitor $C_{tot}$ 1010, and the LISN 810. A capacitance of the capacitor $C_{tot}$ 1010 is calculated according to equation (1). The voltage source $V_{th}$ represents a Thevenin equivalent voltage, which is calculated as follows:

$$V_{th} = V_{2N} + V_p \frac{C_{BE}}{C_{BE} + C_{CE}} - V_{4N}. \tag{7}$$

The voltage source $V_{th}$ models the primary generator of CM EMI in the third stage 1000 and thus the LLC resonant converter 700. It is therefore desirable to reduce or eliminate the voltage source $V_{th}$.

Due to the operation of the LLC resonant converter 700, the voltage sources $V_{2N}$, $V_p$ are related as shown in relationship (3) and the voltage sources $V_{4N}$, $V_p$ are related as follows:

$$V_{4N} = -\frac{V_p}{2n}. \tag{8}$$

Substituting relationship (3) and equation (8) into equation (7) provides $$V_{th} = -\frac{V_p}{2} + V_p \frac{C_{BE}}{C_{BE} + C_{CE}} + \frac{V_p}{2n} \quad (9)$$

$$V_{th} = V_p \left( \frac{C_{BE}}{C_{BE} + C_{CE}} + \frac{1-n}{2n} \right).$$

As can be seen, the following equation eliminates $V_{th}$ in equation (9):

$$\frac{C_{BE}}{C_{BE} + C_{CE}} = \frac{n-1}{2n} \quad (10)$$

$$C_{BE} = \frac{n-1}{n+1} C_{CE}.$$

Eliminating $V_{th}$, the primary generator of CM EMI, therefore reduces CM EMI.

Figure 11:
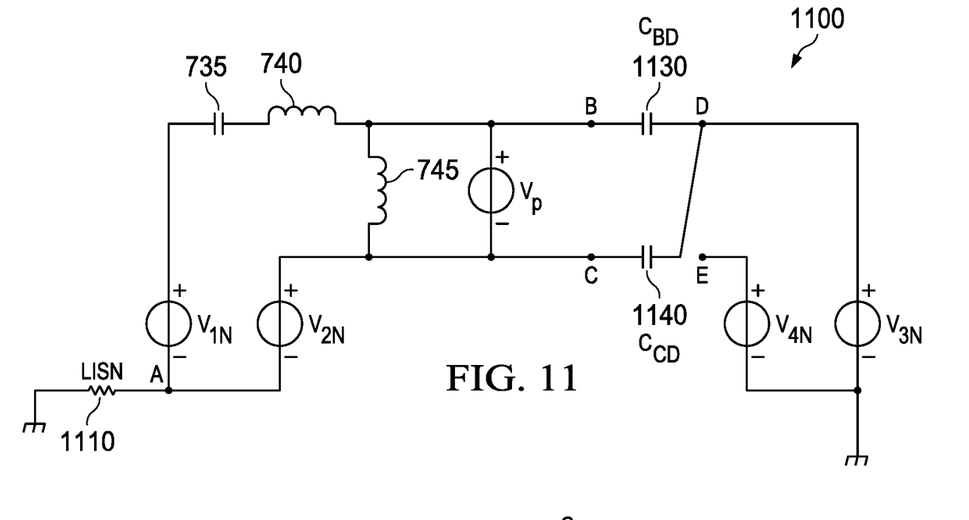
FIG. 11 is a schematic diagram of a first stage of a second model of the LLC resonant converter in FIG. 7 according to an embodiment of the disclosure.
Figure 12:
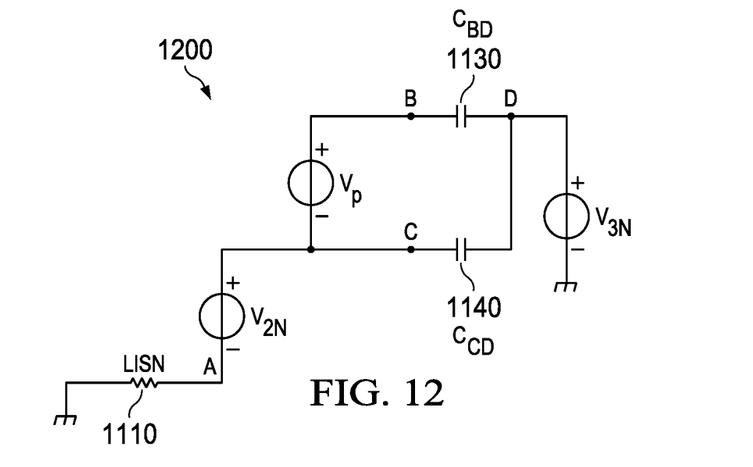
FIG. 12 is a schematic diagram of a second stage of the second model of the LLC resonant converter in FIG. 7 according to an embodiment of the disclosure.
Figure 13:
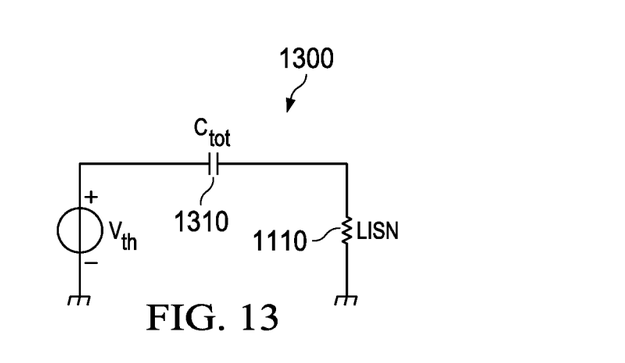
FIG. 13 is a schematic diagram of a third stage of the second model of the LLC resonant converter in FIG. 7 according to an embodiment of the disclosure.

FIG. 11 is a schematic diagram of a first stage 1100 of a second model of the LLC resonant converter 700 in FIG. 7 according to an embodiment of the disclosure. FIG. 12 is a schematic diagram of a second stage 1200 of the second model of the LLC resonant converter 700 in FIG. 7 according to an embodiment of the disclosure. FIG. 13 is a schematic diagram of a third stage 1300 of the second model of the LLC resonant converter 700 in FIG. 7 according to an embodiment of the disclosure. The first stage 1100, the second stage 1200, and the third stage 1300 of the second model are similar to the first stage 800, the second stage 900, and the third stage 1000 of the first model, respectively. For instance, the LISN 1110 represents the resistors 710, 715 in the LISN 705 as a single resistor. However, instead of the capacitors $C_{BE}$ 230, $C_{CE}$ 240, $C_{tot}$ 410 in the first model, the second model comprises capacitors $C_{BD}$ 1130, $C_{CD}$ 1140, $C_{tot}$ 1310.

The capacitor $C_{BD}$ 1130 represents a capacitance across the transformer 750 from node B to node D, and the capacitor $C_{CD}$ 1140 represents a capacitance across the transformer 750 from node C to node D. A capacitance of the capacitor 1310 is calculated as follows:

$$C_{tot} = C_{BD} + C_{CD}. \quad (11)$$

The voltage source $V_{th}$ represents a Thevenin equivalent voltage, which is calculated as follows:

$$V_{th} = V_{2N} + V_p \frac{C_{BD}}{C_{BD} + C_{CD}} - V_{3N}. \quad (12)$$

The voltage source $V_{th}$ models the primary generator of CM EMI in the third stage 1300 and thus the LLC resonant converter 700. It is therefore desirable to reduce or eliminate the voltage source $V_{th}$.

Due to the operation of the LLC resonant converter 700, the voltage sources $V_{2N}$, $V_p$ are related as shown in relationship (3) and the voltage sources $V_{3N}$, $V_p$ are related as follows:

$$V_{4N} = \frac{V_p}{2n}. \quad (13)$$

Substituting relationship (3) and equation (13) into equation (12) provides $$V_{th} = -\frac{V_p}{2} + V_p \frac{C_{BD}}{C_{BD} + C_{CD}} - \frac{V_p}{2n} \quad (14)$$

$$V_{th} = V_p \left( \frac{C_{BD}}{C_{BD} + C_{CD}} - \frac{n+1}{2n} \right).$$

As can be seen, the following relationship eliminates $V_{th}$ in equation (14):

$$\frac{C_{BD}}{C_{BD} + C_{CD}} = \frac{n+1}{2n} \quad (15)$$

$$C_{BD} = \frac{n+1}{n-1} C_{CD}.$$

Eliminating $V_{th}$, the primary generator of CM EMI, therefore reduces CM EMI.

Figure 14:
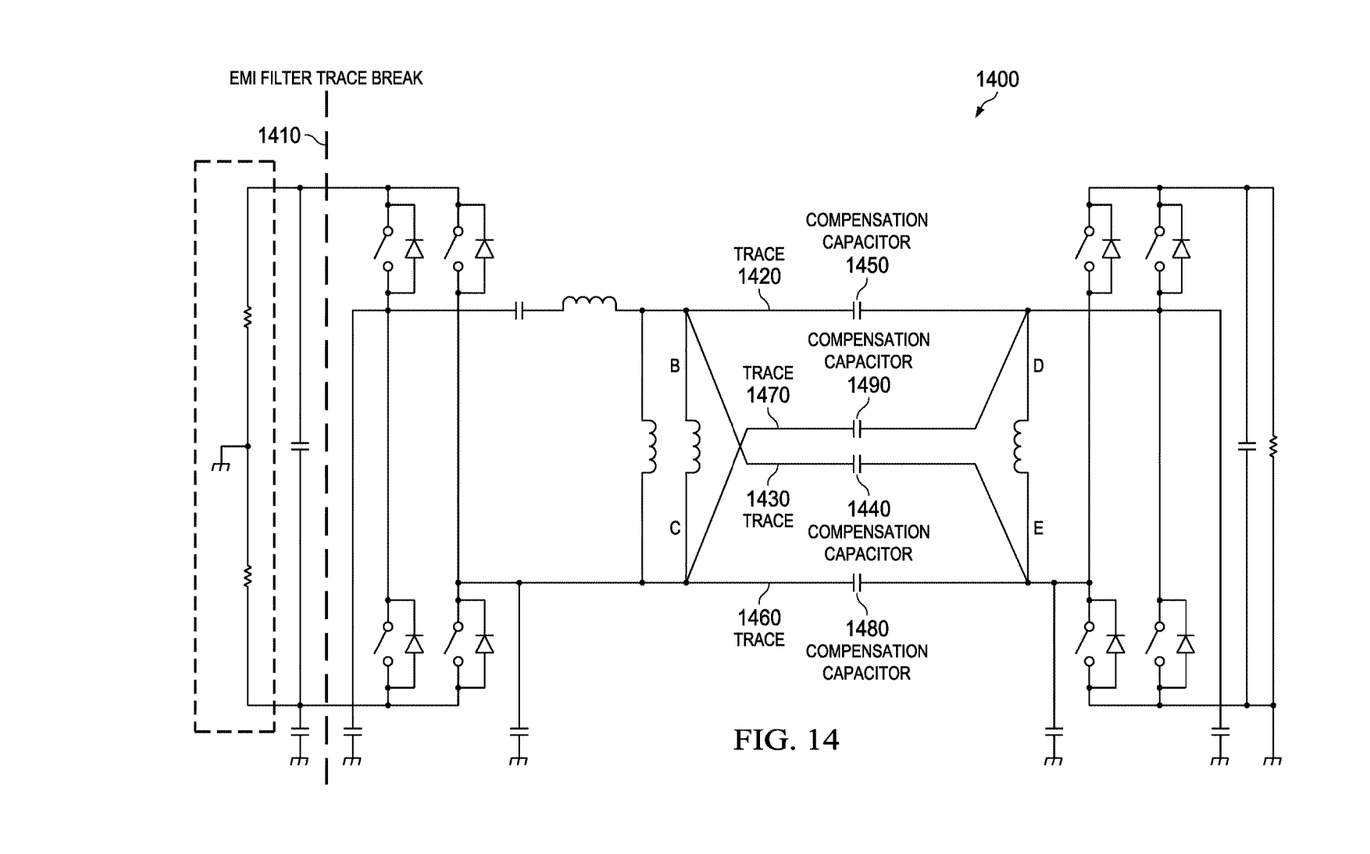
FIG. 14 is a schematic diagram of an LLC resonant converter according to an embodiment of the disclosure.

FIG. 14 is a schematic diagram of an LLC resonant converter 1400 according to an embodiment of the disclosure. The LLC resonant converter 1400 is similar to the LLC resonant converter 500 in FIG. 5. Specifically, the LLC resonant converter 1400 comprises an EMI filter trace break 1410 and traces 1420, 1430, 1460, 1470. However, unlike the LLC resonant converter 500, which comprises two compensation capacitors 540, 550, the LLC resonant converter 1400 comprises four compensation capacitors 1440, 1450, 1480, 1490. Though not shown, the LLC resonant converter 1400 further comprises a capacitor like the capacitor 760 in the LLC resonant converter 700.

The compensation capacitor 1440 is directly coupled to node B and thus the inductors coupled to node B, as well as node E and thus the inductor, diodes, and switches coupled to node E. The compensation capacitor 1450 is directly coupled to node B and thus the inductors coupled to node B, as well as node D and thus the inductor and capacitor coupled to node D. The compensation capacitor 1480 is directly coupled to node C and thus the inductors coupled to node C, as well as node E and thus the inductor, diodes, and switches coupled to node E. The compensation capacitor 1490 is directly coupled to node C and thus the inductors coupled to node C, as well as node D and thus the inductor and capacitor coupled to node D.

The compensation capacitors 1440, 1450, 1480, 1490 compensate a parasitic capacitance between the winding 755 and the winding 765. That parasitic capacitance is represented as the capacitor 760 in the LLC resonant converter 700 and is modeled by the capacitors 830, 840 in the first stage 800 in FIG. 8; the capacitors 830, 840 in the second stage 900 in FIG. 9; the capacitor $C_{tot}$ 1010 in the third stage 1000 in FIG. 10; the capacitors 1130, 1140 in the first stage 1100 in FIG. 11; the capacitors 1130, 1140 in the second stage 1200 in FIG. 12; and the capacitor $C_{tot}$ 1310 in the third stage 1300 in FIG. 13. By compensating the parasitic capacitor 160, the compensation capacitors 1440, 1450, 1480, 1490 satisfy or substantially satisfy equations (10) and (15) and therefore reduce CM EMI.

Specifically, the compensation capacitor 1440 compensates the parasitic capacitance by complementing the capacitor $C_{BE}$ 830. The compensation capacitor 1450 compensates the parasitic capacitance by complementing the capacitor $C_{BD}$ 1130. The compensation capacitor 1480 compensates the parasitic capacitance by complementing the capacitor $C_{CE}$ 840. The compensation capacitor 1490 compensates the parasitic capacitance by complementing the capacitor $C_{CD}$ 1140. Thus, a sum of the compensation capacitor 1440 and the capacitor $C_{BE}$ 830 may be denoted as the capacitor $C_{BE}$ in equation (10), a sum of the compensation capacitor 1450 and the capacitor $C_{BD\ 1130}$ may be denoted as the capacitor $C_{BD}$ in equation (15), a sum of the compensation capacitor 1480 and the capacitor $C_{CE}$ 840 may be denoted as the capacitor $C_{CE}$ in equation (10), and a sum of the compensation capacitor 1490 and the capacitor $C_{CD}$ 1140 may be denoted as the capacitor $C_{CD}$ in equation (15). The compensation capacitors 1440, 1450, 1480, 1490 may be adjustable capacitors in order to account for changes in the capacitors 830, 840, 1130, 1140 due to age, temperature, and other factors.

A manufacturer may fabricate the LLC resonant converter 1400 in different manners. In a first embodiment, the manufacturer first fabricates the LLC resonant converter 1400 without the compensation capacitors 1440, 1450, 1480, 1490; second measures the capacitances of the capacitors 830, 840, 1130, 1140; and third adds any combination of the compensation capacitors 1440, 1450, 1480, 1490 in order to satisfy or substantially satisfy equations (10) and (15). In the latter case, any combination of the compensation capacitors 1440, 1450, 1480, 1490 may comprise capacitances to satisfy equations (10) and (15). In a second embodiment, the manufacturer first fabricates the LLC resonant converter 1400 with the compensation capacitors 1440, 1450, 1480, 1490 as adjustable capacitors; second measures the capacitances of the capacitors 830, 840, 1130, 1140; and third adjusts any combination of the capacitances of the compensation capacitors 1440, 1450, 1480, 1490 in order to satisfy or substantially satisfy equations (10) and (15).

Figure 15:
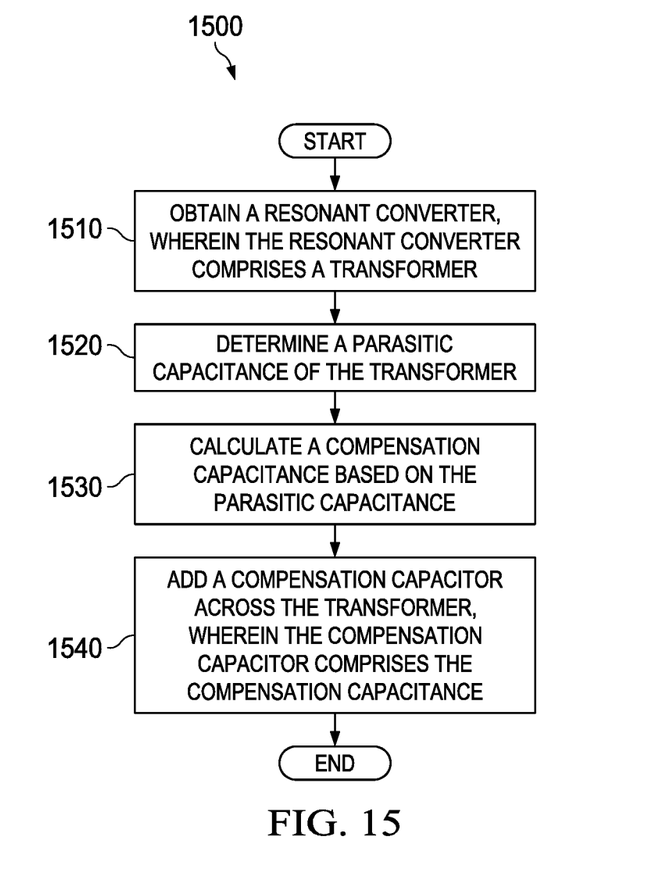
FIG. 15 is a flowchart illustrating a method of manufacturing a resonant converter according to an embodiment of the disclosure.

FIG. 15 is a flowchart illustrating a method 1500 of manufacturing a resonant converter according to an embodiment of the disclosure. At step 1510, a resonant converter is obtained. The resonant converter comprises a transformer. For instance, the resonant converter is the LLC resonant converter 100 or 700, and the transformer is the transformer 155 or 750. At step 1520, a parasitic capacitance of the transformer is determined. For instance, a manufacturer determines through testing the parasitic capacitor 160 or 760. At step 1530, a compensation capacitance is calculated based on the parasitic capacitance. For instance, the manufacturer calculates the compensation capacitance of the compensation capacitor 540, 550, 1440, 1450, 1480, or 1490 based on equations (5), (10), or (15).

Finally, at step 1540, a compensation capacitor is added across the transformer. The compensation capacitor 540, 550, 1440, 1450, 1480, or 1490 comprises the compensation capacitance. For instance, the manufacturer adds the compensation capacitor 540 across the transformer in the LLC resonant converter 500 from node B to node E, the compensation capacitor 550 across the transformer in the LLC resonant converter 500 from node C to node E, the compensation capacitor 1440 across the transformer in the LLC resonant converter 1400 from node B to node E, the compensation capacitor 1450 across the transformer in the LLC resonant converter 1400 from node B to node D, the compensation capacitor 1480 across the transformer in the LLC resonant converter 1400 from node C to node E, or the compensation capacitor 1490 across the transformer in the LLC resonant converter 1400 from node C to node D.

In an example embodiment, an apparatus comprises: a first inductor element coupled to a first node and a second node; a second inductor element coupled to a third node and a fourth node; a third inductor element coupled to the fourth node and a fifth node, wherein the first inductor, the second inductor, and the third inductor form a transformer; and a compensation capacitor element coupled to the fourth node and one of the first node and the second node and comprising a compensation capacitance.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a first inductor coupled to a first node and a second node;
   a second inductor coupled to a third node and a fourth node, wherein the first inductor and the second inductor form a transformer comprising a turns ratio; and
   a compensation capacitor coupled to one of the first node and the third node, the first node and the fourth node, the second node and the third node, and the second node and the fourth node,
   the compensation capacitor comprises a compensation capacitance that is directly proportional to a first order of the turns ratio and not proportional to a square of the turns ratio.

2. The apparatus of claim 1, further comprising:
   a first parasitic capacitance between the first node and the third node;
   a second parasitic capacitance between the first node and the fourth node;
   a third parasitic capacitance between the second node and the third node; and
   a fourth parasitic capacitance between the second node and the fourth node.

3. The apparatus of claim 2, wherein the compensation capacitor is coupled to the first node and the third node, and wherein the compensation capacitance is configured to substantially satisfy an equation based on the first parasitic capacitance, the compensation capacitance, the turns ratio, and the third parasitic capacitance.

4. The apparatus of claim 3, wherein the equation is $$C_{BD} = \frac{n+1}{n-1}C_{CD},$$

where $C_{BD}$ is a sum of the first parasitic capacitance and the compensation capacitance, n is the turns ratio, and $C_{CD}$ is the third parasitic capacitance.

5. The apparatus of claim 2, wherein the compensation capacitor is coupled to the first node and the fourth node, and wherein the compensation capacitance is configured to substantially satisfy an equation based on the second parasitic capacitance, the compensation capacitance, the turns ratio, and the fourth parasitic capacitance.

6. The apparatus of claim 5, wherein the equation is $$C_{BE} = \frac{n-1}{n+1}C_{CE},$$

where $C_{BE}$ is a sum of the second parasitic capacitance and the compensation capacitance, n is the turns ratio, and $C_{CE}$ is the fourth parasitic capacitance.

7. The apparatus of claim 2, wherein the compensation capacitor is coupled to the second node and the third node, and wherein the compensation capacitance is configured to substantially satisfy an equation based on the first parasitic capacitance, the turns ratio, the third parasitic capacitance, and the compensation capacitance.

8. The apparatus of claim 7, wherein the equation is $$C_{BD} = \frac{n+1}{n-1}C_{CD},$$

where $C_{BD}$ is the first parasitic capacitance, n is the turns ratio, and $C_{CD}$ is a sum of the third parasitic capacitance and the compensation capacitance.

9. The apparatus of claim 2, wherein the compensation capacitor is coupled to the second node and the fourth node, and wherein the compensation capacitance is configured to substantially satisfy an equation based on the second parasitic capacitance, the turns ratio, the fourth parasitic capacitance, and the compensation capacitance.

10. The apparatus of claim 9, wherein the equation is $$C_{BE} = \frac{n-1}{n+1}C_{CE},$$

where $C_{BE}$ is the second parasitic capacitance, n is the turns ratio, and $C_{CE}$ is a sum of the fourth parasitic capacitance and the compensation capacitance.

11. The apparatus of claim 2, wherein the compensation capacitor is an adjustable capacitor.

12. The apparatus of claim 2, wherein the apparatus is an inductor-inductor-capacitor (LLC) resonant converter.

13. The apparatus of claim 12, wherein the apparatus comprises a first full bridge on a primary side of the transformer.

14. The apparatus of claim 13, wherein the apparatus comprises a second full bridge on a secondary side of the transformer.

15. The apparatus of claim 2, wherein the compensation capacitance is configured to reduce common-mode (CM) electromagnetic interference (EMI).

16. A method comprising:
obtaining an apparatus comprising a first inductor and a second inductor, the first inductor is coupled to a first node and a second node, the second inductor is coupled to a third node and a fourth node, and the first inductor and the second inductor form a transformer comprising a turns ratio;
measuring a parasitic capacitance between the first node and the third node, the first node and the fourth node, the second node and the third node, or the second node and the fourth node;
determining a compensation capacitance that is directly proportional to a first order of the turns ratio and not proportional to a square of the turns ratio; and
adding to the apparatus a compensation capacitor comprising the compensation capacitance.

17. The method of claim 16, wherein the adding comprises inserting the compensation capacitor between the first node and the third node or between the first node and the fourth node.

18. The method of claim 16, wherein the adding comprises inserting the compensation capacitor between the second node and the third node or between the second node and the fourth node.

19. A method comprising:
obtaining an apparatus comprising a first inductor, a second inductor, and a compensation capacitor, the first inductor is coupled to a first node and a second node, the second inductor is coupled to a third node and a fourth node, the first inductor and the second inductor form a transformer comprising a turns ratio, and the compensation capacitor comprises an adjustable compensation capacitance;
measuring a parasitic capacitance between the first node and the third node, the first node and the fourth node, the second node and the third node, or the second node and the fourth node; and
adjusting the adjustable compensation capacitance so that it is directly proportional to a first order of the turns ratio and not proportional to a square of the turns ratio.

20. The method of claim 19, wherein the adjustable compensation capacitance is between the first node and the third node, the first node and the fourth node, the second node and the third node, or the second node and the fourth node.

* * * * *